United States Patent
Sakellarides

(10) Patent No.: US 9,573,348 B2
(45) Date of Patent: Feb. 21, 2017

(54) LIDDING STRUCTURE BASED ON AROMATIC POLYESTER FILM, COEXTRUDED WITH A SEALABLE/PEELABLE EPDXY-CONTAINING THERMOPLASTIC POLYMER

(71) Applicant: Stefanos L. Sakellarides, East Greenwich, RI (US)

(72) Inventor: Stefanos L. Sakellarides, East Greenwich, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 499 days.

(21) Appl. No.: 13/668,596

(22) Filed: Nov. 5, 2012

(65) Prior Publication Data
US 2014/0127515 A1     May 8, 2014

(51) Int. Cl.
*B32B 27/08*      (2006.01)
*B32B 27/20*      (2006.01)
(Continued)

(52) U.S. Cl.
CPC .............. *B32B 27/08* (2013.01); *B32B 27/20* (2013.01); *B32B 27/308* (2013.01); *B32B 27/32* (2013.01); *B32B 27/36* (2013.01); *B32B 27/38* (2013.01); *B32B 37/153* (2013.01); *C08K 3/36* (2013.01); *C08L 23/0846* (2013.01); *C08L 23/0869* (2013.01); *C08L 33/068* (2013.01); *C08L 33/14* (2013.01); *C08L 63/00* (2013.01); *C09D 123/0884* (2013.01); *C09D 163/00* (2013.01); *C09J 7/0285* (2013.01); *C09J 123/0846* (2013.01); *C09J 123/0869* (2013.01); *C09J 123/0884* (2013.01); *C09J 133/068* (2013.01); *C09J 133/14* (2013.01); *B32B 2250/02* (2013.01); *B32B 2250/03* (2013.01); *B32B 2250/24* (2013.01); *B32B 2264/102* (2013.01); *B32B 2270/00* (2013.01);
(Continued)

(58) Field of Classification Search
None
See application file for complete search history.

(56) References Cited

U.S. PATENT DOCUMENTS 4,192,788 A * 3/1980 Dodson .................. C09J 151/06
                                                                 524/271
4,632,959 A * 12/1986 Nagano ................. C08F 255/00
                                                                  525/100

(Continued)

FOREIGN PATENT DOCUMENTS

JP        2003-171484    *   6/2003
WO         96/19333        6/1996

*Primary Examiner* — Vivian Chen
(74) *Attorney, Agent, or Firm* — Pillsbury Winthrop Shaw Pittman LLP

(57) ABSTRACT

A multi-layer film structure suitable as a sealable sheet used for closing foodstuff containers with a peelable seal. This multi-layer film comprises a polyester substrate layer and a heat-sealable layer. The heat-sealable layer is applied by coextrusion and contains an epoxy-containing thermoplastic polymer composition comprising residues of epoxy-containing monomers selected from glycidyl methacrylate, glycidyl acrylate, allyl glycidyl ether, 3,4-epoxy-1-butene, and a mixture of any two or more of such monomers.

15 Claims, 5 Drawing Sheets

Structures of two- and three-layer coextruded lidding films

(51) Int. Cl.

| | |
|---|---|
| *B32B 27/30* | (2006.01) |
| *B32B 27/32* | (2006.01) |
| *B32B 27/36* | (2006.01) |
| *B32B 37/15* | (2006.01) |
| *C08K 3/36* | (2006.01) |
| *C08L 23/08* | (2006.01) |
| *C08L 33/14* | (2006.01) |
| *C09J 123/08* | (2006.01) |
| *C09J 133/14* | (2006.01) |
| *C08L 63/00* | (2006.01) |
| *C09J 7/02* | (2006.01) |
| *C09J 133/06* | (2006.01) |
| *C09D 163/00* | (2006.01) |
| *C08L 33/06* | (2006.01) |
| *C09D 123/08* | (2006.01) |
| *B32B 27/38* | (2006.01) |
| *C08L 67/02* | (2006.01) |
| *C08L 67/03* | (2006.01) |

(52) U.S. Cl.
CPC ....... *B32B 2307/30* (2013.01); *B32B 2307/31* (2013.01); *B32B 2307/744* (2013.01); *B32B 2307/748* (2013.01); *B32B 2333/04* (2013.01); *B32B 2333/08* (2013.01); *B32B 2367/00* (2013.01); *B32B 2435/00* (2013.01); *B32B 2439/40* (2013.01); *B32B 2439/70* (2013.01); *C08L 23/0884* (2013.01); *C08L 67/02* (2013.01); *C08L 67/03* (2013.01); *C08L 2203/162* (2013.01); *Y10T 428/287* (2015.01); *Y10T 428/2826* (2015.01); *Y10T 428/2891* (2015.01); *Y10T 428/31511* (2015.04); *Y10T 428/31797* (2015.04); *Y10T 428/31935* (2015.04)

(56) References Cited

U.S. PATENT DOCUMENTS

| | | | | |
|---|---|---|---|---|
| 4,654,255 | A * | 3/1987 | Kojima et al. | 442/149 |
| 4,656,094 | A * | 4/1987 | Kojima et al. | 428/412 |
| 4,737,548 | A * | 4/1988 | Kojima et al. | 525/193 |
| 5,021,510 | A * | 6/1991 | Vroomans | 525/285 |
| 5,888,599 | A | 3/1999 | Bradt | |
| 6,423,401 | B2 * | 7/2002 | Peiffer et al. | 428/216 |
| 6,616,998 | B2 * | 9/2003 | Greer | B32B 27/36 428/213 |
| 6,939,584 | B2 | 9/2005 | Sankey | |
| 7,141,293 | B2 | 11/2006 | Peiffer | |
| 7,205,040 | B2 | 4/2007 | Peiffer | |
| 7,329,453 | B2 | 2/2008 | Peiffer | |
| 7,413,800 | B2 | 8/2008 | Wood, Jr. | |
| 7,442,427 | B2 | 10/2008 | Peiffer | |
| 7,871,696 | B2 * | 1/2011 | Kinigakis et al. | 428/323 |
| 2001/0012557 | A1 * | 8/2001 | Willham | B32B 27/36 428/215 |
| 2004/0052993 | A1 | 3/2004 | Dawes | |
| 2004/0127614 | A1 * | 7/2004 | Jiang et al. | 524/270 |
| 2004/0146730 | A1 * | 7/2004 | Holzer | B29C 55/023 428/515 |
| 2005/0131120 | A1 * | 6/2005 | Flexman | 524/399 |
| 2005/0159549 | A1 * | 7/2005 | Kendig | B32B 27/08 525/119 |
| 2006/0014022 | A1 * | 1/2006 | Kendig | B32B 1/02 428/421 |
| 2006/0014036 | A1 * | 1/2006 | Kendig | B32B 1/02 428/522 |
| 2006/0105126 | A1 * | 5/2006 | Kendig | B32B 27/08 428/35.2 |
| 2006/0172131 | A1 * | 8/2006 | Haedt | B32B 7/06 428/336 |
| 2006/0173133 | A1 * | 8/2006 | Flexman et al. | 525/191 |
| 2006/0269707 | A1 * | 11/2006 | Berbert | B65D 75/305 428/35.7 |
| 2008/0017543 | A1 * | 1/2008 | Pahlberg | A61J 1/2093 206/532 |
| 2008/0260305 | A1 * | 10/2008 | Shah | B65D 33/002 383/211 |
| 2009/0061138 | A1 * | 3/2009 | Peiffer et al. | 428/41.3 |
| 2009/0297857 | A1 * | 12/2009 | Pascal | C09D 123/0869 428/421 |
| 2010/0108127 | A1 * | 5/2010 | Hayes | B32B 1/00 136/251 |
| 2010/0291396 | A1 * | 11/2010 | Peiffer et al. | 428/483 |
| 2011/0253296 | A1 * | 10/2011 | Lee et al. | 156/227 |
| 2012/0117921 | A1 * | 5/2012 | Toft et al. | 53/452 |

* cited by examiner

Structures of two- and three-layer coextruded lidding films

Photographic examples of poor and good sublayer formation in coextrusion (melt curtain exiting die)

Poor: Low melt viscosity copolyesters of the type described in the prior art US Patents 7,205,040; 7,141,293; 7,329,453; and 7,442,427

Good sublayer formation (e.g. typical of Example 1)

LIDDING STRUCTURE BASED ON AROMATIC POLYESTER FILM, COEXTRUDED WITH A SEALABLE/PEELABLE EPDXY-CONTAINING THERMOPLASTIC POLYMER

FIELD OF THE INVENTION

The embodiments herein relate to a heat-sealable film for peelable container lids and a method of making such film. For example, they relate to a composite having a polyethylene terephthalate (PET) film coextruded with a layer comprising, as major component, suitable epoxy-containing thermoplastic polymer that provides heat sealability, forming a substantially completely peelable multilayer film suitable for container lids.

BACKGROUND OF THE INVENTION

Peelable packaging films are frequently utilized in diverse container sealing applications. Primarily they are used to seal the mouths of foodstuff or medicine containers. In such applications, they firstly provide closure of the mouth to prevent unintended initial loss of the contents. They provide a solid-, vapor- and liquid-tight barrier to prevent contamination and spoilage of the contents. Being non-resealable once opened, they provide a security function by alerting the consumer whether the contents of a presumably unopened container have been potentially tampered with. Films intended for container sealing applications such as these are sometimes referred to as "lidding" films. (See FIG. 1).

Most basically, conventional lidding films include at least two component layers. First a base layer forms a mechanical closure preventing foreign substances from entering the container. Second a seal layer, which has a melting point or softening point below that of the base layer, which most commonly is thermally adhered to the circumference of the container mouth, provides a seal removable by peeling, In an embodiment without tearing or leaving sealant material on the container. Many sophisticated modifications and additions to these basic components have developed to provide advantageous features to peelably lidded containers.

A particular disadvantage of some film-lidded containers is that the adhesion of the lidding film to the container is so strong that the film is difficult to remove from the container without destruction of the seal layer or tears in the entire film cross-sections; in such cases, the strong adhesion can undesirably wholly or partially delaminate the lidding film leaving pieces adhered to the lip of the container mouth. If the adhesion to the container mouth is made too weak, the lidding film can be removed inadvertently or prematurely by many incidental causes including, for example, pressure and movement of the contained material. Ideally a seal layer that combines a good seal strength (typically in excess of 0.7 lb/in) and also a clean peel, free of tears is desired. A further requirement is that a seal with good peel characteristics can be obtained over a wide temperature range, typically between 350 and 425° F. for CPET (crystalline polyethylene terephthalate). Within this range, it is desirable that the seal strength profile vs. temperature be as flat as possible, to allow interchangeability between different packaging sites using different sealer settings.

Many sealable films known in the art are coextruded. Films made by coextruding PET as a base layer with an amorphous PET copolymer (typically obtained by substituting, e.g. 18 mole % of the terephthalic acid with isophthalic acid or by substituting up to 33 mole % of the ethylene glycol with cyclohexanedimenthanol) are often used in applications requiring permanent sealing of the film to itself, e.g. bag construction. While these coextruded films are cost-effective to produce, the films obtained are not truly peelable as they often tear and split when removed from the package, often sticking to the food, especially to foods that contain sauces and cheese such as pizza. One reason for this is that seal materials that are coextrudable with PET (such as the copolyester of ethylene glycol with about 82 molar parts terephthalic acid/and 18 molar parts isophthalic acid or the copolyester of terephthalic acid with about 33 mole % of 1,4-cyclohexane dimethanol with about 67 mole % of ethylene glycol (for example, Eastman Chemical Co.'s Eastar™ grade PETG™ 6763) require a high melt viscosity in order to be compatible with PET in coextrusion. As a result, of this high viscosity, they cannot form adequate seals on CPET trays unless the seal temperature approaches that of the melting point of the CPET substrate. This, combined with the fact that such materials have typically glass transition temperature (Tg) above room temperature results in destructive (weld-type) seals.

Several patents propose as a remedy coextrusion of a seal layer having a copolyester partially based on aliphatic dicarboxylic acids (such as adipic, sebacic, azelaic acids) and partially based on aromatic acids such as terephthalic acid, that have glass transition temperatures below room temperature (typically in the range between −40° C. and 10° C. and melt temperatures generally below 160° C.). A melting temperature (Tm) in this range enables sealing at temperatures suitable for CPET or APET trays whereas the Tg below room temperature enables peeling characterized by plastic deformation (yield) which enables the film to sustain stresses resulting from peeling forces without suffering brittle failure. U.S. Pat. Nos. 7,205,040; 7,141,293; 7,329,453; and 7,442,427 describe coextruded seal layers comprising copolyesters based on aromatic/aliphatic diacarbocylic acid combinations providing peelable seal strengths in the range of 1.1 to 3.4 lb/in at a seal temperature of 392° F., depending on exact copolyester composition and skin thickness. Although those patents do not allude to any issues related to coextrusion stability, it has been the experience of the applicant that a disadvantage of coextrusion processes having skin layers of copolyesters based partially on aliphatic diacids is the frequent occurrence of flow instabilities related to viscosity mismatch between the less viscous partially aliphatic diacid-based copolyester skin and the higher-viscosity polyethylene terephthalate core; even if a lower melt extrusion temperature is employed on the skin or satellite extruder, the die block has to be kept at a temperature above the melting temperature of the PET homopolymer, (typically above 505° F.) which reheats the skin material to a temperature where its viscosity becomes too low resulting in gross irregularities. Because of that, some of these patents (e.g. U.S. Pat. No. 7,413,800 recommend using a multimanifold die, although they do not offer a clarification whether there is separate temperature control for the low viscosity channel providing the cap layer.

Because of the difficulty in consistently coextruding with PET a suitable hot melt adhesive skin layer material providing peelable seals, alternative methods such as off-line or in-line coating techniques have been employed.

Off-line coating can be conducted either by melt extrusion (extrusion coating) or by solvent coating, which bears the additional cost and environmental risk of handling organic solvents.

Exemplary peelable, sealable films used for lidding and packaging foods known in the art are described in U.S. Pat. No. 5,888,599. These films are prepared by a multi-step process in which a core film is first prepared comprising a base layer which is then solvent-coated with a hot melt adhesive in a separate step (off-line coating;) to form a skin layer whose function is to provide a peelable heat seal. Peelable seal strengths up to 0.88 lb/in have been attained at seal temperature 180° C. and seal layer thickness of about 2 µm; however solvent-coating techniques present the disadvantage of additional costs and environmenal risks associated with handling and recycling organic solvents Sealable extrusion coatings laminated off-line can be either polyesters (such as those described for example in US patent application US2004/0052993 or vinyl polyolefins such as ethylene vinyl acetate (EVA). A disadvantage of off-line coated polyester sealants is that, if conducted by extrusion coating, that process results in relatively thick coatings (typically 20 µm or higher) which increase the overall cost significantly; or, if applied by solvent coating, the solvents have the disadvantages listed above. EVA coatings have the disadvantage of poor adhesion to the PET base film; for that reason, additional primer and tie layers need to be applied during extrusion coating, which increase overall cost and complexirty.

Inline coating methods are preferable because they result in lower thickness; in such methods, the coating is conducted between the machine direction orientation and the transverse direction orientation steps that are parts of a typical biaxial orientation film production process. For instance, U.S. Pat. No. 6,939,584 describes an inline extrusion coating method for obtaining a heat-sealable and peelable skin layer having a copolyester derived from one or more dicarboxylic acids and one ore more glycols.

Alternatively to inline extrusion coating, inline coating with aqueous suspensions of hot-melt polymeric substances is also possible, provided that formation of stable suspensions and achievement of coalescence during the transverse orientation step are possible. For example, WO A-96/19333 describes a process for producing peelable films, in which the heat-sealable, peelable layer is applied inline to the polyester film from an aqueous dispersion that also contains about 10 wt. % of an organic solvent. In the example provided, the heat-sealable material is a copolyester of terephthalic acid/adipic acid/sulfoisophthalic acid/butanediol, ethylene glycol, and polybutane-diol.

It is evident from the above that there is an unmet need for obtaining a reliable peelable seal at relatively lower temperatures by employing standard coextrusion techniques (as opposed to the more expensive inline or offline techniquest currently employed). This patent seeks to accomplish that by utilizing a seal layer substantially having an epoxy-containing impact modifying copolymer, more specifically an ethylene copolymer comprising methyl acrylate and glycidyl methacrylate functional groups. The inclusion of such functionalized ethylene terpolymers has been described in the prior art in U.S. Pat. No. 6,616,998. However the levels claimed are between 0 and 25%, with the remaining blend component being a PET copolymer or a copolyester; furthermore, the articles produced are coextruded sheets that have not been subjected to stretching to form flexible films but instead were tested and used in the extruded sheet form and the sealing performance illustrated by the examples referred to self-sealing as opposed to lidding film sealing on thermoformed trays.

SUMMARY OF THE INVENTION

Figure 1:
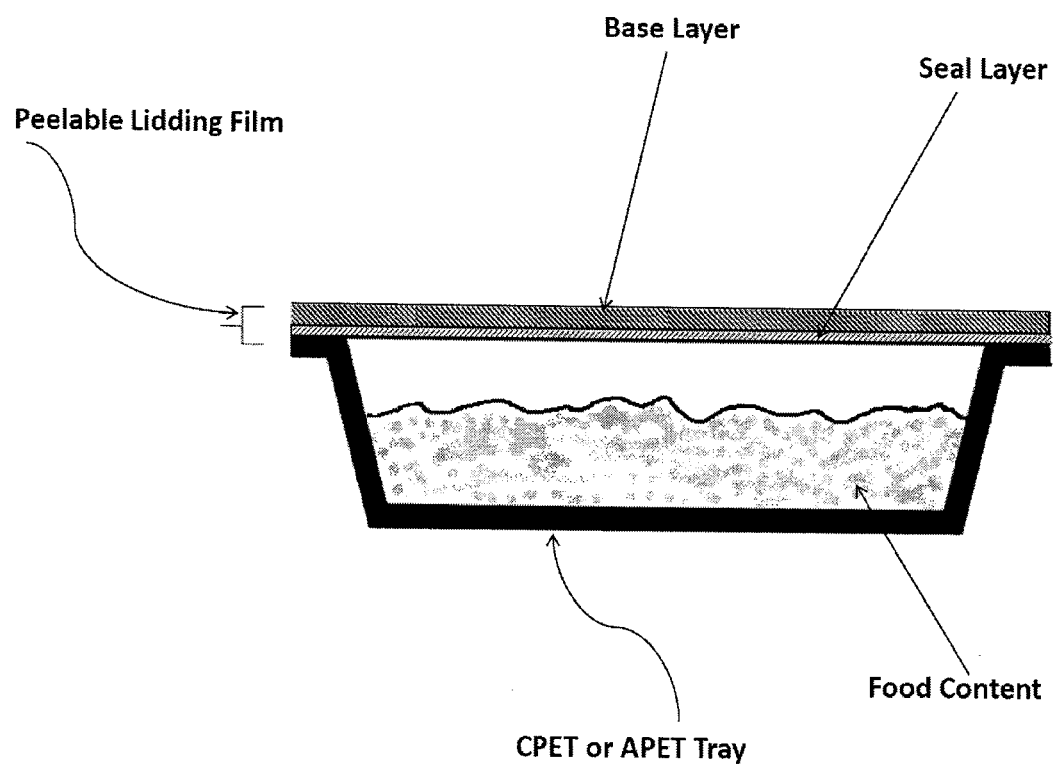
FIG. 1—Schematic showing a container with a film as a lid.

The embodiments herein relate to a multilayer composite lidding film having at least two co-extruded main component layers, namely in order, a polyester base layer for mechanical integrity and a heat seal layer comprising an epoxy-containing impact modifying copolymer The heat seal layer is constructed by coextrusion. This configuration attains peelable seals within the temperature range between 275 and 425 F in excess of a 1 b/in for a skin layer thickness of 7.5 µm or between 0.6-1 lb/in for a skin layer thickness of 2.5 µm.

An embodiment relates to a film comprising a heat-sealable surface layer and a polyester-containing core layer, wherein the heat-sealable layer comprises greater than 30 wt. % of an epoxy-containing thermoplastic polymer, wherein the film is a coextruded heat-sealable and peelable multilayer thermoplastic film. In other embodiments, the wt. % of the epoxy-containing thermoplastic polymer in the heat-sealable layer could be 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, 100 wt. %.

In an embodiment, the polyester-containing layer contains greater than 70 wt. % polyester. In other embodiments, the wt. % of polyester in the polyester-containing layer could be 75 wt. %, 80 wt. %, 85 wt. %, 90 wt. %, 95 wt. %, 100 wt. %. In an embodiment, the epoxy-containing thermoplastic polymer comprises residues of epoxy-containing monomers selected from glycidyl methacrylate, glycidyl acrylate, allyl glycidyl ether, 3,4-epoxy-1-butene, or a mixture of any two or more of such monomers. In an embodiment, an amount of residue of epoxy-containing monomers is 20 wt. % or less in the epoxy-containing thermoplastic polymer. In an embodiment, an amount of residue of epoxy-containing monomers is less than 15 wt. %, 10 wt. % or 5 wt. % in the epoxy-containing thermoplastic polymer. In an embodiment, the epoxy-containing thermoplastic polymer comprises polyolefin. In an embodiment, the epoxy-containing thermoplastic polymer comprises a random terpolymer of ethylene, methyl acrylate and glycidyl methacrylate. In an embodiment, the heat-sealable layer further comprises ethylene ethyl acrylate. In an embodiment, the heat-sealable layer comprises between 0-25% (including 20%, 15%, 10% or 5%) of an amorphous thermoplastic copolyester comprising: (a) Diacid residues of at least about 50 mole percent of terephthalic acid, naphthalenedicarboxylic acid, 1,4-cyclohexanedicarboxylic acid or mixtures thereof; (b) Diacid residues of between 0 and about 50 mole percent of isophthalic acid; and (c) Diol residues of between 100 and 65 mole percent of ethylene glycol and between 0 and 35 mole percent of 1,4-cyclohexanedimethanol. In an embodiment, the heat-sealable layer is a copolymer comprising about 99.5 to about 90 weight percent ethylene and about 0.5 to about 10 weight percent glycidyl methacrylate or a terpolymer comprising about 98 to about 60 weight percent ethylene, about 1 to about 30 weight percent alkyl acrylate, and about 1 to about 10 weight percent glycidyl methacrylate. In an embodiment, the ethylene copolymers and terpolymers have a melt index of about 1 to about 20 grams per 10 minutes measured at 190° C. with 2.16 kilogram weight of ASTM D1238. In an embodiment, the ethylene terpolymer has a melting point of 60° C. and a melt index of 6 measured at 190° C. with 2.16 kilogram weight of ASTM D1238. In an embodiment, a seal strength of the film at 375° F. with sealing done between the heat-sealable surface layer and crystalline polyethylene terephthalate is at least 0.75 lb/in. In an embodiment, the ethylene terpolymer consists of about 24 wt. % methyl acrylate, 8 wt. % glycidyl methacrylate, and 68 wt. % ethylene. In an embodiment, the substrate polyester layer comprises silica antiblock particles in the core layer. In an embodiment, there is another secondary layer adjacent to the skin layer comprising poly(ethylene terephthalate) and silica antiblock particles. In an embodiment, sealable peelable skin layer comprises between 0 and 25 percent by weight of a copolyester of terephthalic acid with a diol mix comprising about 33 mole % 1,4-cyclohexane dimethanol and about 67 mole % ethylene glycol.

Another embodiment relates to a method of making a coextruded heat-sealable and peelable multilayer thermoplastic film comprising coextruding a heat-sealable surface layer and a polyester-containing core layer, wherein the heat-sealable layer comprises greater than 30 wt. % of an epoxy-containing thermoplastic polymer.

DETAILED DESCRIPTION OF THE INVENTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 2:
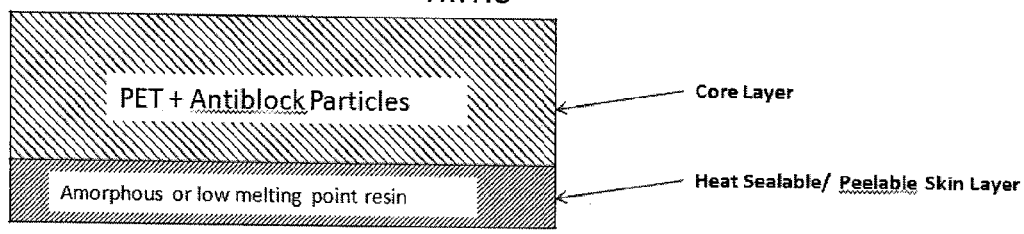
FIG. 2—Schematic of structures of two- and three-layer lidding films.
Figure 2:
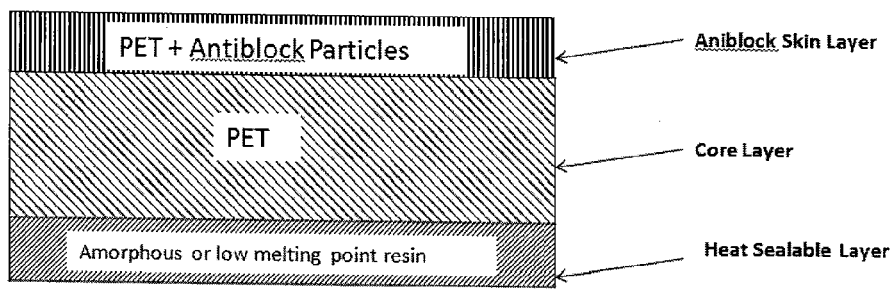

FIG. 2 shows a schematic of structures of coextruded two- and three-layer lidding films. In an embodiment, the film comprises a skin layer A, coextruded on top of the main PET layer B, which skin layer comprises an ethylene impact modifying terpolymer (such as one based on ethylene/methyl acrylate/glycidyl methacrylate). The base layer may also optionally include organic or inorganic particulates for various purposes such as to facilitate winding and handling of the film, or to enhance the mechanical and optical properties of the film, including reduction of the density of the film via cavitation. Representative examples of such particulate additives to the base layer are, but not limited to: amorphous silica, calcium carbonate, clay, talc, diatomaceous earth, cross-linked spherical polymers such as poly(dimethylsiloxane), glass beads, or mixtures of two or more of these. Moreover, to reduce material costs the base layer can optionally include a filler or extender component, such as regrinded recycled layer or film composition, or any other polymeric composition having suitably compatible processing and physical properties.

Alternatively, the base layer can remain unfilled and the particulate additives incorporated in skin layer (C) as shown in the second (third-layer) structure in FIG. 2.

The film can be stretched in one or two orthogonal directions, i.e., for mono- or biaxial orientation. This treatment provides greater and also permits the film to be produced to a thinner cross section dimension.

As will be further explained, sealing of the lid formed by the novel film to a storage container is achieved by a thermally activated bond between the outer, heat seal layer of this film and the container mouth. For effective peel performance when the consumer removes the lid, it is important that the strength of the bond between the heat seal layer and the underlying barrier layer is robust and durable. Selection of the adhesion layer and the method of incorporating it into the multilayer film have been developed to advantageously produce such adhesion very efficiently.

The heat seal layer (sometimes referred to as the skin layer or skin layer "A") comprises at least 75% and In an embodiment at least 90% of thermally activatable adhesive composition, typically referred to as hot melt adhesive resin. The skin layer provides the film with the ability to be heat-sealed to itself or to other films, sheets, trays or other substrates. These other materials are typically made from crystallized polyethylene terephthalate (CPET), amorphous polyethylene terephthalate (APET), foil, polyethylene terephthalate-coated paperboard, polyvinyl chloride (PVC), glass, aliphatic olefin polymers such as polypropylene (PP) and polyethylene (PE), and other polyolefins such as polystyrene (PS) and the like.

The preferred hot melt, thermally activatable adhesive composition includes polymers selected from the group having ethylene copolymers or terpolymers functionalized with a group capable of creating chemical bonding with the polyester material present in both the base layer as well as in the container surface onto which the lidding film is applied by heat sealing. At the same time its olefinic character provides good adhesion to olefin-based containers, such as those made from polypropylene.

An epoxy-containing thermoplastic polymer is any thermoplastic polymer containing an epoxy group. An extensive description of suitable epoxy-containing impact modifying copolymers can be found by reference to U.S. Pat. No. 6,616,998, which is incorporated herein in its entirety by reference. The impact modifying polymers are comprised of epoxy-containing monomers selected from glycidyl methacrylate, glycidyl acrylate, allyl glycidyl ether, 3,4-epoxy-1-butene, or a mixture of any two or more of such monomers. The epoxy-containing thermoplastic polymer can be a copolymer or terpolymer. It can contain be a polyolefin such as polyethylene or polypropylene. Some compositions within the scope of an epoxy-containing thermoplastic polymer include:

E-EA-GMA (68:24:8) (ethylene-methyl acrylate-glycidyl methacrylate terpolymer);
E-EA-GMA (68:24:8) (ethylene-ethyl acrylate-glycidyl methacrylate terpolymer);
E-BA-GMA (63:31:6) (ethylene-butyl acrylate-glycidyl methacrylate terpolymer); and
E-GMA (92:8) (ethylene-glycidyl methacrylate copolymer)

These glycidyl methacrylate copolymers and terpolymers can used in combination with a non-reactive elastomeric (rubber-containing) toughener such as ethylene ethyl acrylate (EEA). For example, a blend of these two tougheners (e.g., a 30:70 blend) could be a highly effective system for improving both the impact performance and the adhesion of the epoxy-containing thermoplastic polymer-containing skin layer to the PET core layer (by taking into advantage the grafting reaction of the epoxy functionality to the PET matrix in order to create a strong bond of the skin layer to the core layer) and to a PET or PP tray (to which sealing the skin layer of the multilayer film is bonded to in one embodiment. The rubber content of EAA (e.g. ethylene ethyl acrylate) will play a role in facilitating a clean ductile peel behavior due to its elastomeric character.

The epoxy-containing polymers may be prepared either by copolymerization or grafting. In the former preparation, the epoxy-containing monomers above are copolymerized with other monomers such as ethylene and, optionally alkyl acrylates. A preferred composition comprises ethylene, methyl acrylate and glycidil methacrylate. The ethylene based polymers of the present invention In an embodiment have melt flow index values ranging from about 0 to about 30 g/10 minutes when measured at 190.degree. C. with 2.16 kg weight of ASTM D1238. However, those with melt index values ranging from about 1 to about 20 g/10 minutes are preferred.

An embodiment of the inventive heat-seal layer compositions is epoxy-containing impact modifying terpolymers that possess the following combination of physical properties: a melting point below about 70° C. (for Lotader AX 8900, the melting point on a DSC scan, second heat at 10° C./min was found to be 64.28° C.); a Tg below room temperature, in an embodiment below 10° C. (common temperature of a container taken recently out of a refrigerator); and a melt flow rate compatible with that of film-grade PET, exemplified e.g. by a value of 6 g/10 min of ASTM D 1238. An exemplary compound selected from that class of epoxy-containing impact modifying terpolymers, was found to provide peelable seals on CPET containers, when incorporated at levels where it is the majority component, as opposed to the prior art, which covers only levels up to 25%, with the remainder of the blend of the heat-sealing composition comprising about 50 mole percent terephthalic acid, naphthalenedicarboxylic acid, 1,4-cyclohexanedicarboxylic acid, or mixtures thereof; and ii. diol residues of about 90 to about 35 mole percent ethylene glycol and about 10 to about 65 mole percent of at least one of diethylene glycol or 1,4-cyclohexanedimethanol. Those levels, where the inventive compound is the minority component, were found in comparative examples to give very weak seals at heat seal temperatures less than or fusion (destructive seals).

It is believed that the combination of low melting temperature, and low glass transition temperature favors the formation of strong, peelable seals over a wide temperature range, whereas the high melt viscosity (manifested by the relatively low melt flow rate) makes the molten material rheologcally compatible with the underlying film substrate, facilitating smooth coextrusion operation, devoid of interface instabilities. The flexibility and the impact strength at low temperature increase with higher amounts of acrylate comonomer (methyl, ethyl, or butyl acrylate;) content According to a manufacturer's literature a (Lotader® grades from Arkema), "the glass transition temperature (Tg) of the specific acrylate present influences the low temperature properties", which also affect peelability:

|  | Tg (G″) |
| --- | --- |
| Methyl Acrylate: | −30° C. |
| Ethyl Acrylate: | −35° C. |
| Butyl Acrylate: | −45° C. |

The heat seal composition is applied by coextrusion methods well known in the art. The heat seal layer composition can be modified by addition of organic or inorganic particulates for various purposes. Representative examples of such additives include, but are not limited to: amorphous silica, calcium carbonate, clay, talc, diatomaceous earth, cross-linked spherical polydimethylsiloxane, cross-linked spherical organic polymers, or glass beads, or mixtures of two or more of these ingredients; slip agents such as but not limited to a fatty amide: erucamide, stearamide, behenamide, or bisamides (e.g. stearyl-erucamide), silicone oil, mixtures of same; anti-fog agents such as, but not limited to glycerol monostearate; and anti-static agents such as, but not limited to glycerol monostearate and tertiary amines, or combinations thereof. The heat seal layer can be monolithic or it can be formed from two or more strata. A stratified heat seal layer can be free of certain additives in its sub-layers, i.e., those closer to the adhesive layer and additives in the outermost stratum. For example, slip agent particulates can be incorporated into the outermost stratum of the heat seal layer to reduce blocking of the film and promote ease of film handling. This particular seal layer can also be modified by an electrical or discharge-treatment method (such as corona, flame, or plasma) to provide specific seal properties to specific substrates. The desired applied watt density for this layer could be in range of 0.5 to 5 (watts/square feet/min).

Certain additives are useful in modifying properties other than sealing properties of the peelable blend. Examples of some of the properties which can be modified are UV stability, thermal stability and color.

While the embodiments have been described in detail and with reference to specific examples thereof, it will be apparent to one skilled in the art that various changes and modifications can be made therein without departing from the spirit and scope thereof.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Epoxy-Containing Impact Modifying Material

Figure 3:
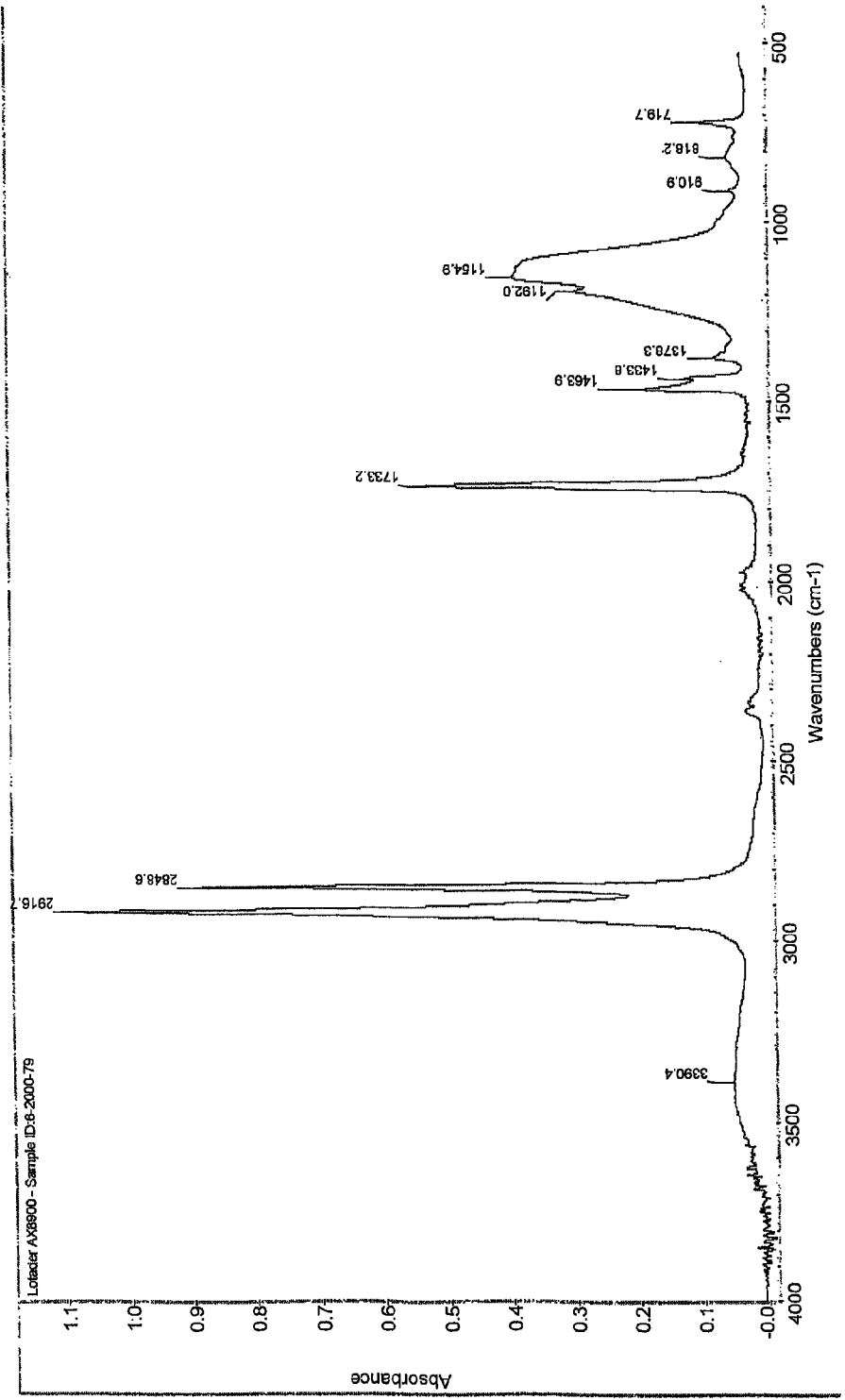
FIG. 3—FTIR plot of Lotader® AX8900.

The epoxy-containing impact modifier material used was a random terpolymer of ethylene, methyl acrylate, and glycidyl methacrylate, having a melting point of 60° C. and a melt Index of 6 (at 190° C./2.16 kg), available from Arkema Inc. under the trade name Lotader® AX8900. Its molecular make-up, quoted by the manufacturer, is 24 wt. % methyl acrylate, 8 wt. % glycidyl methacrylate, and 68 wt. % ethylene. The FTIR plot of Lotader® AX8900 is shown in FIG. 3.

Amorphous Copolyester

"PETG 6763" is an amorphous copolyester, commercially available from Eastman Chemical under the tradename Eastar 6763, with an IV of 0.76 dl/and is a copolyester of terephthalic acid with about 33 mole % 1,4-cyclohexane dimethanol and about 67 mole % ethylene glycol Crystalline Polyester Preparation "PET Resin A": Polyethylene terephthalate resin, hereby mentioned as "PET Resin A" can be polymerized by any known method. For example, a molten mixture of purified terephthalic acid and excess ethylene glycol was heated and water vapor was removed via distillation which also served to reflux ethylene glycol vapors back into the reactor. After completion of the esterification reaction, manifested by the termination of water evolution, the resulting mix of ethyleneterephthalte esters and oligomers was heated, in the presence of an antimony trioxide esterification catalyst, and water and excess ethylene glycol were removed under vacuum leaving a residual melt of polyester. This melt was discharged via strand die into a cooling trough, pelletized, crystallized by passing through a fluidized bed under hot air at 155° C. and residence time 30 min and then further dried to remove residual moisture to less than about 50 ppm. Antimony trioxide 0.0265 wt. %, magnesium acetate tetrahydrate 0.2029 wt. %, 85% phosphoric acid 0.0661 wt. %, 5% potassium hydroxide 0.12 wt. % were also used to prepare polyester A. Chip IV was 0.65 dl/g and surface resistivity 0.21 MΩ.m. External particles were not added to polyester A.

"PET Resin B":Particles, being SiO2 particles of an average particle size of about 2.6 μm (micrometers), were admixed into polyethylene terephthalate co-polymerized by a known method: A melt slurry of ethylenegylcol and purified terephthalic acid was heated, in the presence of an esterification catalyst, and water and excess ethylene glycol were removed under vacuum leaving a residual melt of polyester. This melt was discharged via strand die into a cooling trough, pelletized, and then further dried to remove residual moisture to less than about 50 ppm. Tetraethyl ammonium hydroxide of 0.049 wt %, lithium acetate dihydrate of 0.882 wt %, antimony trioxide of 0.039 wt %, and calcium acetate of 0.090 wt %, and trimethylphosphate of 0.042 wt % were also used to prepare polyester B. The content of particles in the polyester pellet (B) was 2.0%.

Test Methods

The various properties in the above examples were measured by the following methods:

Intrinsic viscosity (IV) of the resin were tested of ASTM D 460. This test method is for the IV determination of poly(ethylene terephthalate) (PET) soluble at 0.50% concentration in a 60/40 ratio of phenol/1,1,2,2-tetrachloroethane solution by means of a glass capillary viscometer.

The melt volume resistivity of the resin was measured by placing 14 grams of the material in a test tube, and then placing the tube in a block heater until the material completely melted (typically in 2-3 minutes). Next, parallel thin metal probes connected to a resistometer were dipped into the melt and the resistance was measured.

Seal Stength was measured by heat sealing on a SENTINEL Sealer model 12 ASL at temperatures between 200° F. and 425° F. (25° F. intervals), 0.5 second dwell, and 30 psi seal jaw pressure. The test specimen consisted of a 1" wide piece of lidding film and a 1" wide piece of CPET or APET tray (cut from the unoriented inside bottom surface). Sealing was done between that surface and the heat-seal layer coated surface of the film. Peel strength was measured at 180° angle using an E-Z Peel Tester from Shimadzu at a rate of 12 in/min. The tester calculates the average of the zig-zag pattern during the steady state section of the peel (horizontal average) without taking into account the original stress inception or the final stress decay section when the film reaches the end of the sealed portion. The test is repeated three times and the number provided in the examples is the average of the three steady-state averages. The following patents by Mitsubishi Polyester Films, all of which are incorporated by reference in their entirety, contain a schematic explaining the E-Z Peel test:

U.S. Pat. No. 7,141,293 (FIG. 2 of the patent)
U.S. Pat. No. 7,442,427 (FIG. 2 of the patent)
U.S. Pat. No. 7,329,453 (FIG. 2 of the patent)
U.S. Pat. No. 7,205,040 (FIG. 2 of the patent)

Seal Initiation Temperature (SIT) is interpolated from the seal strength vs. temperature data, data as the temperature corresponding to a seal strength of 200 gf/in (0.44 lb/in).

Example 1 (Ex. 1)

A 236 gauge (55 μm) two-layer mono-axially drawn polyester film was prepared by co-extruding a skin layer having 100% Lotader AX8900 adjacent to a core layer having a 96:5 wt. % blend of PET Resin A and PET Resin B, using a three layer multimanifold die, with Lotader AX8900 fed into one of the skin layers by the first secondary extruder at 520 F and the 95:5 blend of PET Resin A/PET Resin fed into both the main of the second skin layer by the main extruder and the second secondary extruder, both at 530 F. The extrudate was cast on a cooling drum and subsequently stretched longitudinally at 180° F. by a ratio of 2.5. The resulting thickness of the Lotader AX8900 skin layer was about 7.5 μm.

Figure 4:
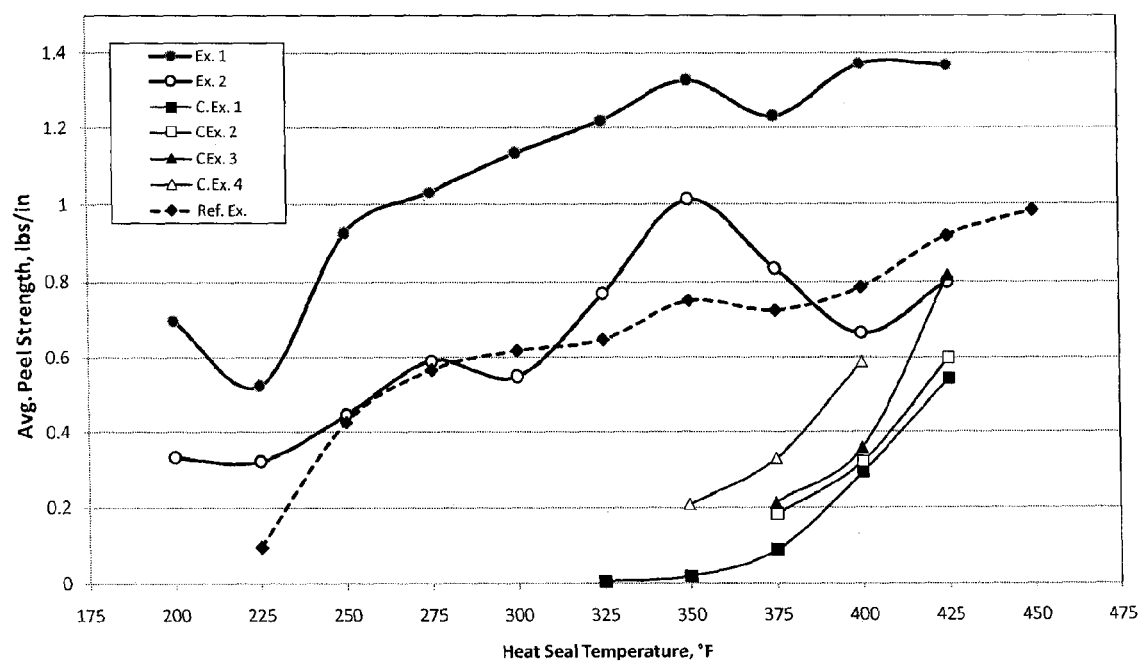
FIG. 4—Plot of seal strength versus temperature corresponding to the examples, comparative examples, and reference example.

The seal seam strengths on CPET are shown in Table 1 and plotted in FIG. 4. Clean peels were obtained in all cases and also at even higher temperatures (e.g. 450° F. not shown in Table 1)

Example 2 (Ex. 2)

The mono-axially stretched film of Example 1 was subsequently stretched by an additional 1.4 ratio along the machine direction and by a ratio of 3 in the transverse direction at a temperature of 195 F, resulting in a total stretch ratio of 3.5×3. The resulting film has a total thickness of 56 gauge (14 μm) with the Lotader AX8900 skin having a thickness around 2 μm. The seal seam strengths on CPET are shown in Table 1 and plotted in FIG. 4. Clean peels were obtained in all cases and also at even higher temperatures (e.g. 450° F. not shown in Table 2)

TABLE 1

| | Seal Strength (lb/in) on CPET Trays for seal temperature: | | | | | | | | | | SIT |
|---|---|---|---|---|---|---|---|---|---|---|---|
| | 200° F. | 225° F. | 250° F. | 275° F. | 300° F. | 325° F. | 350° F. | 375° F. | 400° F. | 425° F. | (° F.) |
| Ex. 1 | 0.70 | 0.52 | 0.93 | 1.03 | 1.13 | 1.22 | 1.33 | 1.23 | 1.37 | 1.37 | <200 |
| Ex. 2 | 0.33 | 0.32 | 0.45 | 0.59 | 0.55 | 0.77 | 1.01 | 0.84 | 0.66 | 0.80 | 249 |
| CEx. 1 | | | | | | | 0.00 | 0.02 | 0.09 | 0.29 | 0.54 | 415 |
| CEx. 2 | Not tested in view of low value at 375° F. | | | | | | | 0.18 | 0.32 | Destr. | >400 |
| CEx. 3 | Not tested in view of low value at 375° F. | | | | | | | 0.21 | 0.36 | 0.82 | 404 |
| CEx. 4 | Not tested in view of low value at 350° F. | | | | | | 0.21 | 0.33 | 0.59 | Destr. | 386 |
| Ref. Ex. | Not tested | 0.09 | 0.43 | 0.57 | 0.62 | 0.65 | 0.75 | 0.72 | 0.79 | 0.92 | 258 |

SIT = Seal Initiation Temperature

Comparative Example 1 (CEx. 1)

A 48 gauge (12 μm) two-layer uniaxially drawn polyester film was prepared by co-extruding a skin layer having PETG Eastar 6763 adjacent to a core layer having a 96:5 wt. % blend of PET Resin A and PET Resin B, using a three layer multimanifold die, with the PETG resin fed into one of the skin layers by the first secondary extruder at 510 F and the 95:5 blend of PET Resin A/PET Resin fed into both the main the second skin layers by the main extruder and the second secondary extruder, both at 530° F. The extrudate was cast on a cooling drum and subsequently stretched longitudinally at 180° F. by a ratio of 3 and then transversely at 185° F. by a ratio of 4. The resulting thickness of the amorphous (PETG) skin layer was about 2 μm.

The seal seam strengths on CPET are shown in Table 1 and plotted in FIG. 4. Clean peels were obtained in all cases. However a slightly higher seal temperature (430° F.) produced partially destructive peels.

Comparative Example 2 (CEx. 2)

The procedure of Comparative Example 1 was repeated but this time the skin layer consisted of a 97:3 (by weight) blend of PETG and Lotader AX8900. The seal seam strengths on CPET are shown in Table 1 and plotted in FIG. 4. Clean peels were obtained in all cases, except at the highest temperature tried (425° F.) where the peel was partially destructive.

Comparative Example 3 (CEx. 3)

The procedure of Comparative Example 1 was repeated but this time the skin layer consisted of a 95:5 (by weight) blend of PETG and Lotader AX8900. The seal seam strengths on CPET are shown in Table 1 and plotted in FIG. 4. Clean peels were obtained in all cases. However the next higher seal temperature tried (450° F.) produced totally destructive peels.

Comparative Example 4 (CEx. 4)

The procedure of Comparative Example 1 was repeated but this time the skin layer consisted of a 90:10 (by weight) blend of PETG and Lotader AX8900. The seal seam strengths on CPET are shown in Table 1 and plotted in FIG. 4. Clean peels were obtained in all cases, except at the highest temperature tried (425° F.) where the peel was partially destructive.

Comparative Example 5 (CEx. 5)

Figure 5:
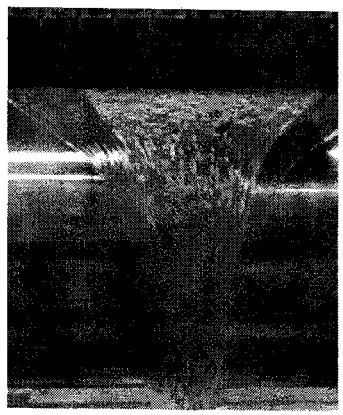
FIG. 5—Photographic examples of poor and good sublayer formation in coextrusion (melt curtain exiting die).
Figure 5:
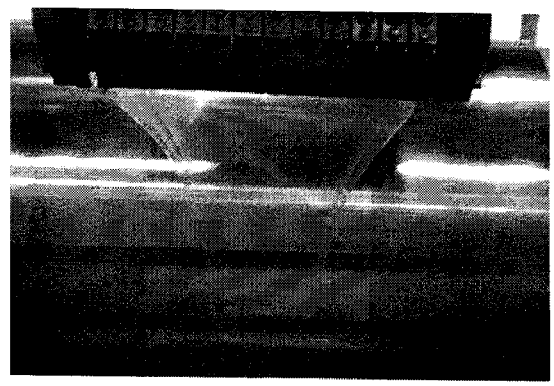

FIG. 5 shows photographic examples of poor and good sublayer formation in coextrusion (melt curtain exiting die). In the example showing good sublayer formation, the molten sublayer has a smooth and flat appearance that enables subsequent film processing, consisting of casting on a cooling drum, orientation along the machine and transverse directions, and toll wind-up. On the other hand, in the example showing poor sublayer formation, the molten sublayer, due to viscosity mismatch to the main layer, has a wavy and bumpy appearance which makes further processing impossible.

Reference Example (Ref. Ex.)

A commercial lidding film, 50 ga in thickness (with a 0.5 μm-thick amorphous polyester seal layer) was also tested for seal strength and the results are included in Table 1 and FIG. 4. Clean peels were obtained in all cases.

Summary of Examples and Comparative Examples

Of the embodiments herein, it was unexpectedly found that even though the prior art has refrained from claiming epoxy-containing impact modifier levels above 25% when mixing with amorphous polyester to form a sealable skin, possibly due to blend incompatibility observed above a certain level (in the case of the investigation described in this invention at or above 20%), there is a distinct advantage in going to the opposite extreme, where the impact modifier is actually the majority ingredient or the only ingredient in skin composition and the co-extruded film can be cast and stretched. The advantage is in terms of seal strength and peelability over a wide seal temperature range demonstrated on CPET trays. The comparative examples demonstrate that acceptable peel strengths on CPET trays cannot be attained when applying the previously claimed composition range, where the epoxy-containing impact modifier is present at levels at or below 25% in combinations with amorphous copolyester.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein in entirety by reference.

I claim:

1. A film comprising a heat-sealable surface layer and a polyester-containing core layer comprising polyethylene terephthalate, wherein the heat-sealable layer consists of an epoxy-containing thermoplastic polymer, wherein the film is a coextruded heat-sealable and peelable multilayer thermoplastic film, wherein a seal strength of the film at 325° F. (163° C.) with sealing done between the heat-sealable surface layer and crystalline polyethylene terephthalate is in a range from about 0.77 lbs/in (349 g/in) to about 1.22 lbs/in (553 g/in).

2. The film of claim 1, wherein the epoxy-containing thermoplastic polymer comprises residues of epoxy-containing monomers selected from glycidyl methacrylate, glycidyl acrylate, allyl glycidyl ether, 3,4-epoxy-1-butene, or and mixture of any two or more of such monomers.

3. The film of claim 1, wherein an amount of residue of epoxy-containing monomers is 20 wt. % or less in the epoxy-containing thermoplastic polymer.

4. The film of claim 1, wherein an amount of residue of epoxy-containing monomers is 10 wt. % or less in the epoxy-containing thermoplastic polymer.

5. The film of claim 1, wherein the epoxy-containing thermoplastic polymer comprises polyolefin.

6. The film of claim 1, wherein the epoxy-containing thermoplastic polymer comprises an ethylene terpolymer of methyl acrylate, glycidyl methacrylate, and ethylene.

7. The film of claim 6, wherein the ethylene terpolymer has a melt index of about 1 to about 20 grams per 10 minutes measured at 190° C. with 2.16 kilogram weight of ASTM D1238.

8. The film of claim 6, wherein the ethylene terpolymer has a melting point of 60° C. and a melt index of 6 measured at 190° C. with 2.16 kilogram weight of ASTM D1238.

9. The film of claim 6, wherein the ethylene terpolymer consists of about 24 wt. % methyl acrylate, 8 wt. % glycidyl methacrylate, and 68 wt. % ethylene.

10. The film of claim 1, wherein a seal strength of the film at 375° F. with sealing done between the heat-sealable surface layer and crystalline polyethylene terephthalate is at least 0.75 lb/in.

11. The film of claim 1, wherein the core layer further comprises a substrate polyester layer, wherein the substrate polyester layer comprises silica antiblock particles.

12. The film of claim 1, further comprising a secondary layer adjacent to the core layer, wherein the secondary layer is on the side of the core layer opposite to the heat-sealable laver, the secondary layer comprising poly(ethylene terephthalate) and silica antiblock particles.

13. A method of making the film of claim 1, comprising coextruding the heat-sealable surface layer and the polyester-containing core layer.

14. The method of claim 13, wherein the polyester-containing layer contains greater than 70 wt. % polyester.

15. The method of claim 13, wherein the epoxy-containing thermoplastic polymer comprises residues of epoxy-containing monomers selected from glycidyl methacrylate, glycidyl acrylate, allyl glycidyl ether, 3,4-epoxy-1-butene, or and mixture of any two or more of such monomers.

* * * * *